May 31, 1932.  A. C. MARSHALL  1,860,866
JOINT OR CONNECTION FOR TUBULAR BODIES
Filed Sept. 18, 1930
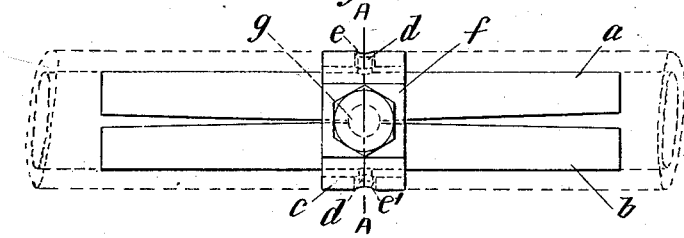
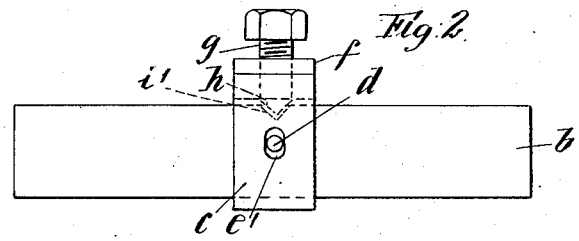
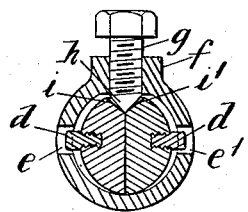
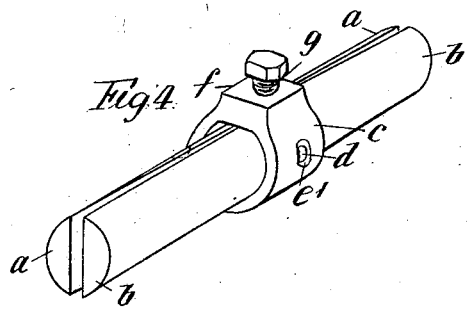
Inventor:
Arnold Clarence Marshall.
By his Attorney;
Harold D. Penney Patented May 31, 1932

1,860,866

UNITED STATES PATENT OFFICE

ARNOLD CLARENCE MARSHALL, OF LONDON, ENGLAND, ASSIGNOR TO MESSRS. STEEL SCAFFOLDING COMPANY, LIMITED, OF LONDON, ENGLAND, A CORPORATION OF GREAT BRITAIN

JOINT OR CONNECTION FOR TUBULAR BODIES

Application filed September 18, 1930, Serial No. 482,729, and in Great Britain May 20, 1930.

This invention relates to joints or connections for tubular bodies and it has for its object to provide an improved device, whereby two tubular bodies, for example tubular scaffold poles, may be placed end to end and rigidly connected and aligned.

According to this invention a body is employed formed longitudinally in two parts, which parts may be of angular or other cross-sectional outline, said body having a collar thereon and having means for securing said collar against movement longitudinally of the said body. Provision is made whereby the component parts of the body may be moved laterally whereby, when engaged with the bore of a tubular body, they tightly engage same. Provision may also be made whereby the parts may rock upon a point disposed more or less in the centre of their length.

In order that the invention may be the better understood, drawings are appended in which:—

Fig. 1 is a plan of a device according to this invention.

Fig. 2 is a side view.

Fig. 3 is a transverse section on line A—A Figure 1.

Fig. 4 is a perspective view.

Referring to the appended drawings $a$, $b$ indicate the component members of the body of the device, said members in the present example being of semicircular cross-sectional outline so that when placed with their flat surfaces together, a substantially circular body is produced, of a diameter such as to normally fit easily within the tubes they engage. $c$ indicates a collar freely encircling the body formed by the two parts $a$ and $b$ and disposed in or substantially in the centre of the length of said body. In order to retain the collar $c$ in position, studs $d$, $d$ are provided, screwed at their inner ends, said screwed portions engaging suitably screw-threaded holes formed in the parts $a$, $b$, as shown in Figure 3. The projecting ends of the studs engage openings or slots $e$, $e^1$, in collar $c$, said openings being elongated as shown whereby the studs are free to move therein when, as will be presently more fully explained, the parts $a$, $b$, are moved laterally with respect to each other. Preferably the adjacent or inner faces of the parts $a$ and $b$ are inclined longitudinally outwards from a point at or adjacent the centre of their length so that they are thus permitted a certain rocking movement under which, in effect, the diameter of the body may be varied so as to permit it to engage tubes having bores of different diameter.

$f$ indicates a boss formed integral with collar $c$, bored at a right angle to the line of the body of the device, said bore being tapped to engage a screw $g$ having the end coned as shown at $h$, said coned end engaging semiconical recesses $i$, $i^1$, formed upon one side of the adjacent faces of parts $a$ and $b$. By operating the screw $g$ the conical end thereof is forced into the recesses $i$, $i^1$ and the parts $a$ and $b$ are forced apart until they tightly engage the tubes, indicated by dotted lines 1 and 2 in Figure 1, surrounding the body, the openings or slots $e$, $e^1$ permitting the studs upon the bodies $a$ and $b$ to move with the said parts so that they do not in any way prevent the desired movement of the said parts. The studs moreover effect the attachment of the collar to the body of the device, and further, should the screw $g$ be entirely removed whilst the device is in engagement with a tube, the parts $a$ and $b$ are prevented from falling down inside the said tube.

Claims:

1. A joint pin or connection for tubular bodies comprising; a pin formed longitudinally in two parts; a collar having an internal bore somewhat larger than the transverse dimensions of the middle portion of the pin and surrounding this portion; means for causing said parts to be moved laterally with respect to each other to thereby expand and contract said pin; in combination with means for preventing displacement of said collar in either direction along said pin and such as to permit of relative angular displacement of said parts in a plane coincident with the plane of their lateral movement comprising pins mounted one upon each of the parts, and slots within said collar with which the respective pins engage.

2. A joint pin or connection for tubular bodies comprising a pin formed longitudinally in two parts; a collar having an internal bore somewhat larger than the transverse dimensions of the middle portion of the pin and surrounding this portion; means upon said collar for causing said parts to be moved laterally with respect to each other to thereby expand and contract said pin; in combination with means for preventing displacement of said collar in either direction along said pin and such as to permit of relative angular displacement of said parts in a plane coincident with the plane of their lateral movement, comprising, pins mounted one upon each of the parts, and slots within said collar with which the respective pins engage.

3. A joint pin or connection for tubular bodies comprising; a pin formed longitudinally in two parts; a collar having an internal bore somewhat larger than the transverse dimensions of the middle portion of the pin and surrounding this portion; a screw upon said collar, semi-conical recesses in the edges of the adjacent faces of said parts engaged by said conical end, whereby on operation of the screw, the parts are forced apart to tightly engage the bodies they enter; in combination with means for preventing displacement of said collar in either direction along said pin and such as to permit of relative angular displacement of the said parts in a plane coincident with the plane of their lateral movement, comprising, pins one upon each of the parts, and slots within said collar with which the respective pins engage.

4. A joint pin or connection for tubular bodies; comprising a pin formed longitudinally in two parts each of which tapers from the centre outwardly to the end; a collar having an internal bore somewhat larger than the transverse dimensions of the middle portion of the pin and surrounding this portion; a screw upon said collar, semi-conical recesses in the edges of the adjacent faces of said parts engaged by said conical end, whereby on operation of the screw, the parts are forced apart to tightly engage the bodies they enter; in combination with means for preventing displacement of said collar in either direction along said pin and such as to permit of relative angular displacement of said parts in a plane coincident with the plane of their lateral movement, comprising, pins one upon each of the parts, and slots within said collar with which the respective pins engage.

In testimony whereof I have hereunto set my hand.

ARNOLD CLARENCE MARSHALL.